United States Patent [19]

Richard

[11] 4,445,914

[45] May 1, 1984

[54] INDUSTRIAL DUST FILTER WITH JET INDUCED REVERSE AIR CLEANING

[75] Inventor: Kenneth L. Richard, York, Pa.

[73] Assignee: York-Shipley, Inc., York, Pa.

[21] Appl. No.: 382,820

[22] Filed: May 28, 1982

[51] Int. Cl.³ ..................... B01D 46/04; B01D 46/48
[52] U.S. Cl. ........................... 55/303; 55/324; 55/332; 55/418; 55/432; 55/466; 55/484
[58] Field of Search ............ 55/302, 303, 324, 332, 55/418, 432, 466, 484

[56] References Cited

U.S. PATENT DOCUMENTS

| | | | |
|---|---|---|---|
| 3,864,108 | 2/1975 | Brookman | 55/302 |
| 3,909,222 | 9/1975 | Caughlin et al. | 55/332 X |
| 3,999,968 | 12/1976 | Brookman | 55/303 X |
| 4,036,614 | 7/1977 | DeMarco | 55/484 X |
| 4,218,227 | 8/1980 | Frey | 55/302 |
| 4,235,610 | 11/1980 | Richard | 55/302 |

Primary Examiner—Kathleen J. Prunner
Attorney, Agent, or Firm—Kemon & Estabrook

[57] ABSTRACT

A self cleaning industrial dust filter includes a housing divided by a tube sheet into an upper clean air chamber and a lower dirty air chamber. Pleated fiber cartridge type filters are supported in the lower chamber from the tube sheet and the interior of the filters communicate with the clean air chamber through openings in the tube sheet, one for each filter. The lower chamber is formed as a plurality of panel venturis which converge downwardly from the lower end of the filters to a narrow throat. A clean air outlet connects with the upper chamber and a dirty air inlet with the lower. Downwardly directed jet nozzles are positioned in each venturi to induce reverse flow through the associated filters, remove accumulated particulates and conduct them to a take out at the base of the lower chamber.

3 Claims, 6 Drawing Figures

INDUSTRIAL DUST FILTER WITH JET INDUCED REVERSE AIR CLEANING

BACKGROUND OF THE INVENTION

The present invention relates generally to a dust filter apparatus of the type shown in my prior U.S. Pat. No. 4,235,610, Nov. 25, 1980, but utilizes a modified structure in which the filter elements are annular pleated fiber type filters as distinguished from the fabric bag filters employed in the above-mentioned patent. Generally speaking, apparatus of this type which employs cartridge filters find primary utility at low flow rates wherein the massive filter area and low filtering velocity combine to provide high efficiency collection of submicron particles and very economical operation.

SUMMARY OF THE INVENTION

The apparatus of the present invention includes in a common housing, an upper clean air chamber and a lower dirty air chamber with a tube sheet separating the two. The cartridge filters are suspended in the dirty air chamber from the tube sheet, surrounding openings therein, and the lower ends of the filters are closed so that the entire outer surface of the filter is exposed to the dirty air chamber. The dirty air chamber converges below the closed end of the filter to a narrow throat thus defining a venturi and means are provided at the bottom of the dirty air chamber for withdrawing accumulated particulates cleaned from the filter surfaces during the cleaning cycle. Downwardly directed jets are positioned in the converging area of the venturi to direct a blast of air downwardly through the venturi throat and thereby induce a reverse flow of air from the clean air chamber into the filter, radially outwardly through the filter walls and then to the base of the dirty air chamber. Conventional outlet means permits the clean air to flow from the clean air chamber and inlet means to the dirty air chamber permit the dirt laden air or gasses to flow horizontally inwardly, and thereafter turn upwardly to pass through the venturis, then radially inwardly of the filters and axially outwardly thereof into the clean air chamber.

DETAILED DESCRIPTION

Figure 1:
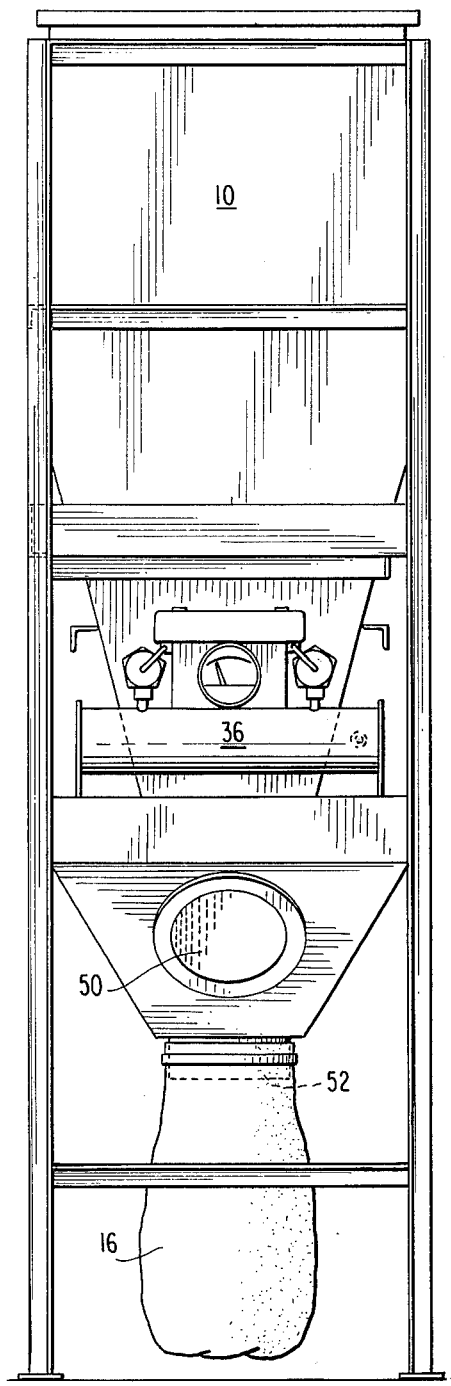
FIG. 1 is a front elevation of the apparatus of this invention.
Figure 2:
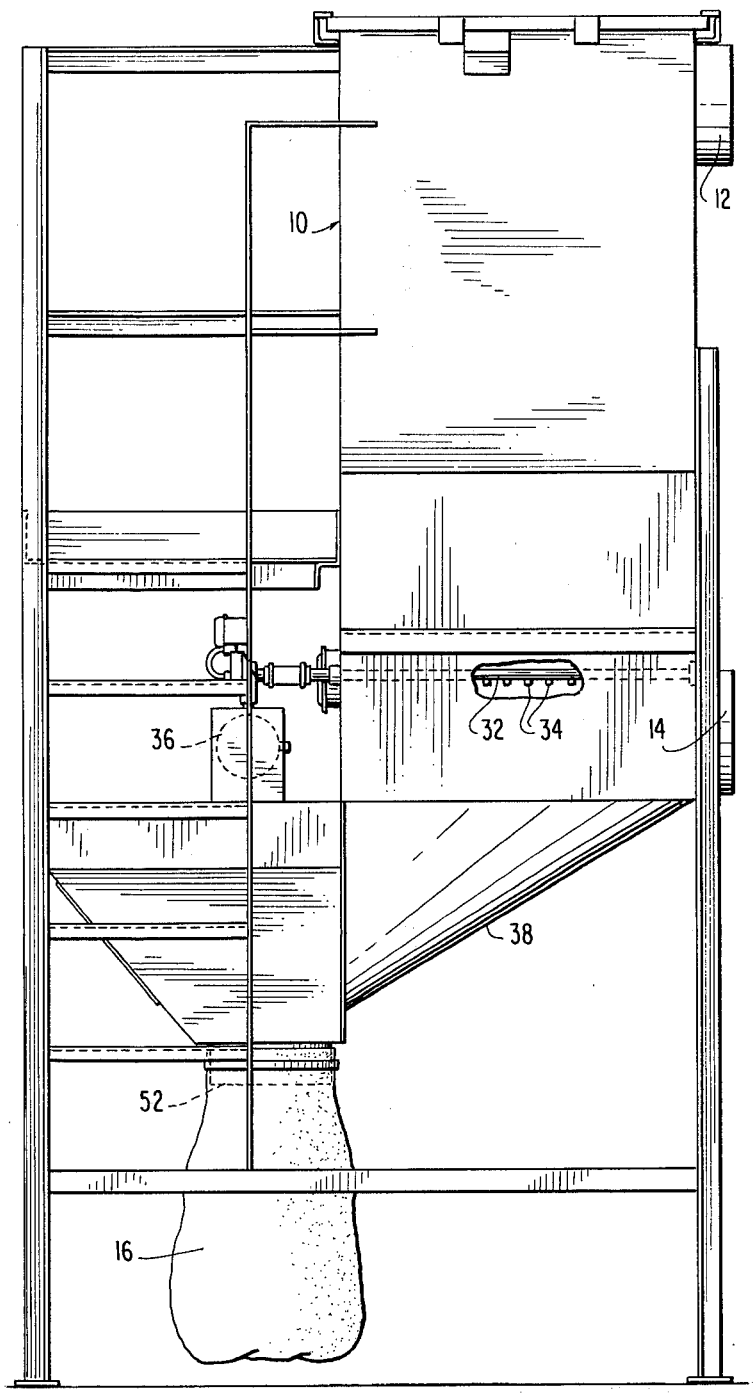
FIG. 2 is a side elevation with a portion broken away.

In FIG. 1 and 2, the apparatus of the present invention is shown as supported in a metal framework which, of course, forms no part of the invention. The housing which encloses the clean and dirty air chambers is indicated at 10 and the clean air outlet appears at 12 in FIG. 2 and the dirty air inlet at 14. Also visible at the lower portion of both Figures is a collection bag 16 for particulates cleaned from the filters during the cleaning cycle.

Figure 5:
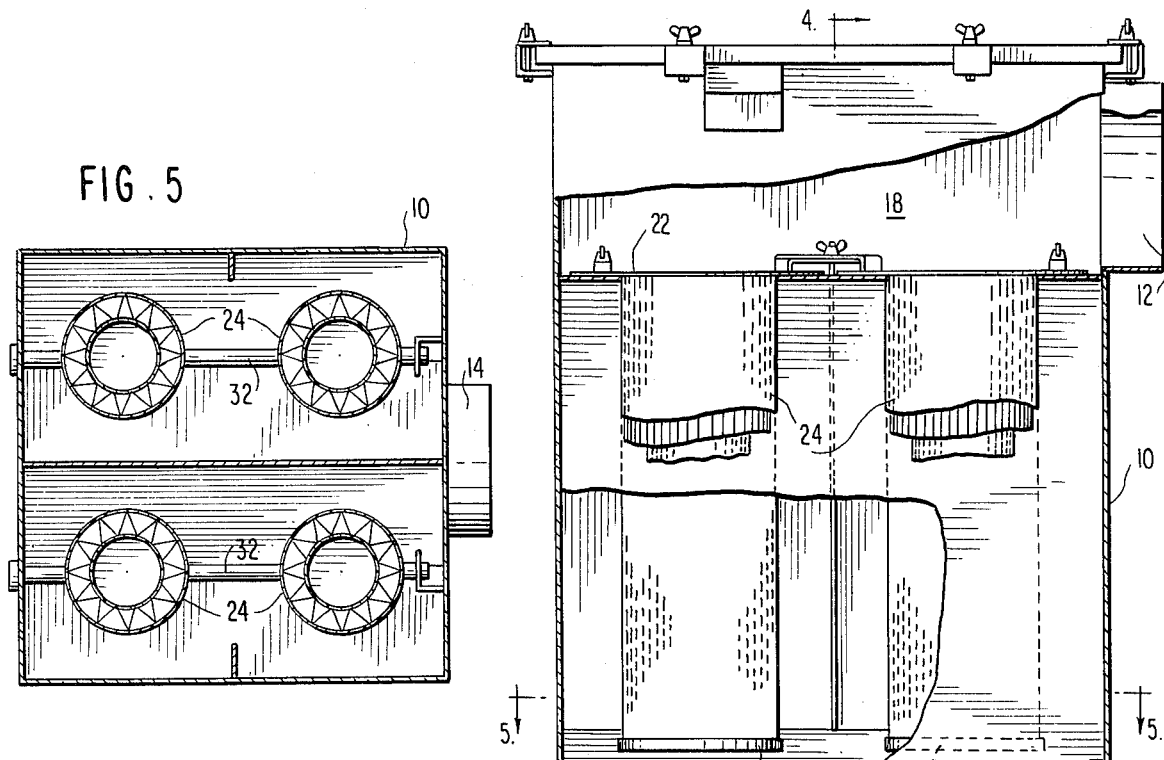
FIG. 5 is a section on the lines 5—5 of FIG. 3.
Figure 3:
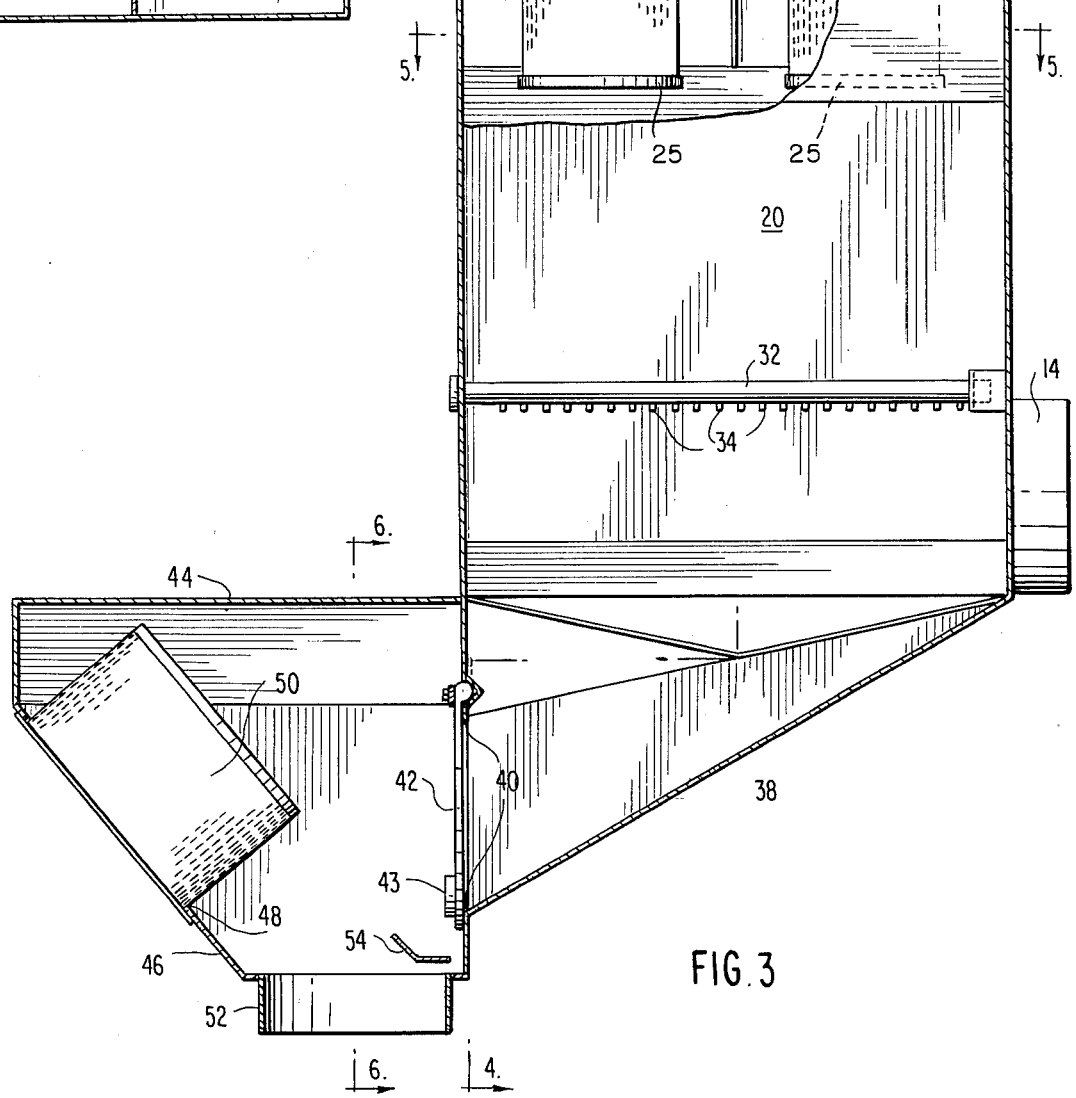
FIG. 3 is an enlarged sectional view in the same direction as FIG. 2, but with the framework removed and parts broken away to show internal structure.
Figure 4:
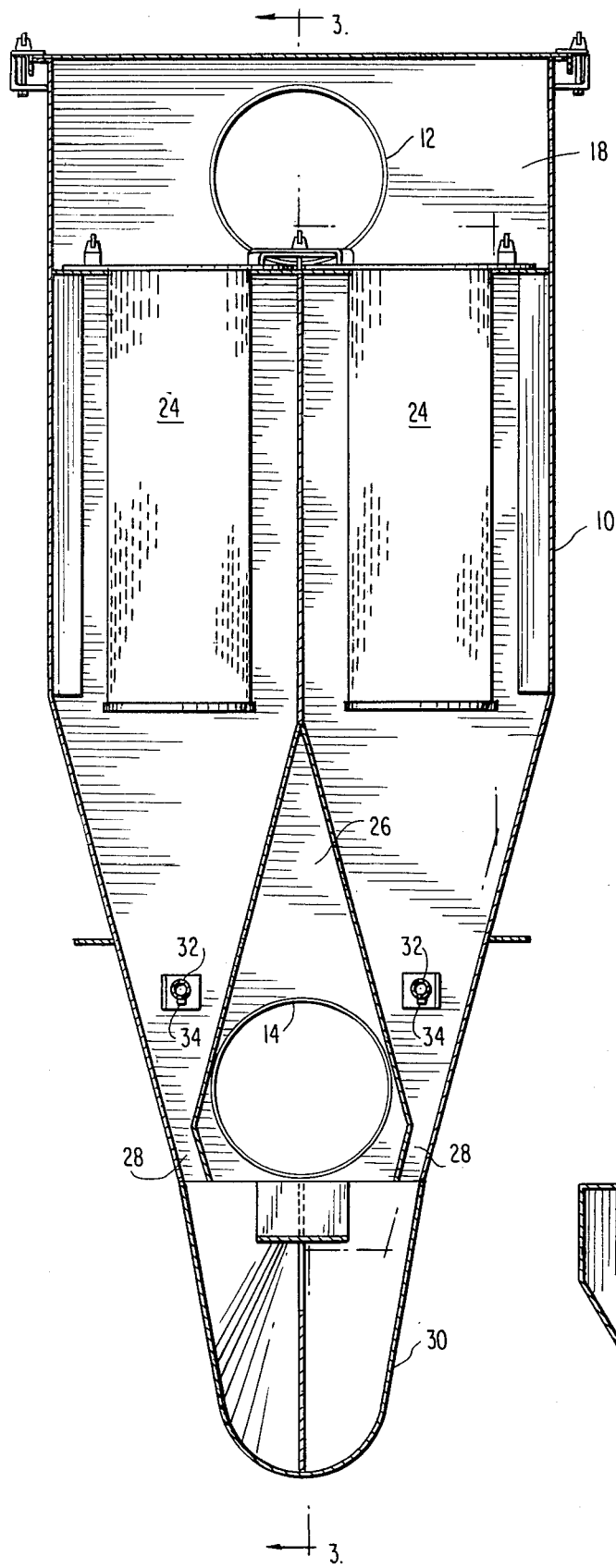
FIG. 4 is a section on the lines 4—4 of FIG. 3.
Figure 6:
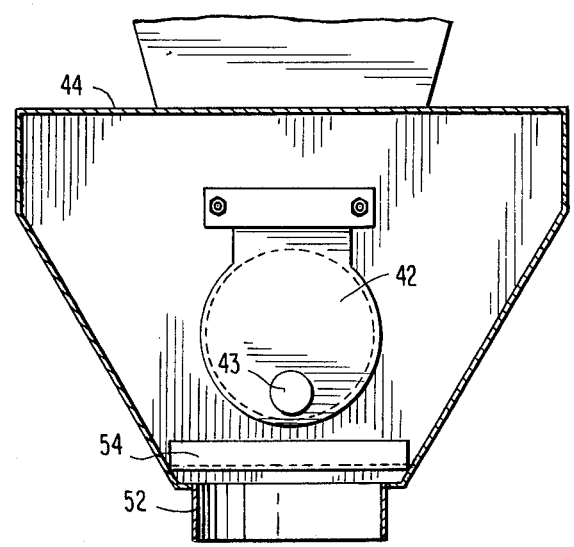
FIG. 6 is a section on the lines 6—6 of FIG. 3.

Referring now to FIGS. 3 and 4, the upper clean air chamber is shown at 18 and the lower dirty air chamber at 20. It will be appreciated that the dirty air chamber is much the larger of the two and extends from the bottom of the apparatus up to the wall or tube sheet 22 which divides the housing 10 into the clean and dirty chambers. In the embodiment illustrated in FIGS. 3, 4, and 5, there are four cartridge filters 24 each of which is supported from the tube sheet 22 so as to surround an opening through the tube sheet and communicating the interior of the filter with the clean air chamber 18. The lower end of each filter is closed as shown at 25 so that only the entire outer surface is disposed within and exposed to the air in the dirty air chamber. As shown in FIG. 4, the outer walls of the housing 10 converge beginning about the lower end of filters 24. The pleated nature of the filters is indicated in the sectional view of FIG. 5. Positioned within the converging portion of the walls 10 is an inverted V-shaped member 26 which together with the converging portions of the wall 10 define a pair of downwardly converging panel type venturis which terminate in throats 28. As can be seen from FIGS. 3 and 4, there are two filters 24 suspended in the upper portion of each venturi.

In the particular embodiment illustrated, since the dirty air inlet 14 is above the lower end of the venturi, it is obvious that the incoming dirty air or gas to be filtered must enter the housing 10 from the inlet 14 and then flow downwardly to the bottom portion of the housing indicated at 30 in FIG. 4, make a U-turn and then flow upwardly through the venturis to the outside of the filter cartridges 24. From there, the flow is radially inwardly of the filters and then axially upwardly out of the filters into the clean air chamber 18.

The downwardly directed jet cleaning means which appear most clearly in FIGS. 3 and 4 includes a horizontally extending pipe 32 with a plurality of equally spaced jet nozzles 34 positioned in the converging portions of the venturis. The pipes are in turn fed by a transverse manifold 36 shown in FIGS. 1 and 2.

Still referring to FIG. 3, it will be seen that the lower portion of the housing 10 has a sloping bottom 38 and that the front wall includes an opening 40, covered by a normally closed flap valve 42. A weight indicated at 43 serves to bias the valve to closed position. A box like chamber 44 extends forwardly from the lower portion of the housing and surrounds the opening 40 and valve 42. The box has an inclined lower surface 46 with an opening 48 therein in which there is mounted a further cartridge filter 50. The lower portion of the box 44 terminates in a downwardly opening spout 52 which provides a mounting for the collection bag 16 shown in FIGS. 1 and 2. A deflector 54, positioned in the box adjacent the flap valve opening, is effective to direct the air or gas flow to the filter 50 while permitting the particulate to settle through the spout 52 into a collection bag or other receptacle.

During normal filtering operations, therefore, the dirty air flows inwardly of the housing 10 through the inlet 14 then to the bottom of the housing 10 where it makes a U-turn and flows upwardly through the two venturis, radially inwardly of the filters 24, axially outwardly of the filters through the tube sheet 22, into the clean air chamber 18 and out of the casing through the outlet member 12. During a cleaning cycle, the jets in one of the two rows of venturis are fired to induce a reverse air flow which cleans the accumulated residue from the filter surfaces and conveys it rapidly into the lower portion of the housing 10. During the cleaning cycle for one row, the other row, of course, can remain on stream. This flow opens the normally closed flap valve 42 and the flow is deflected by the member 54 upwardly to the filter 50 and the particulate matter into the collection bag 16 through the spout 52. The purpose of the filter 50 in the box 44 is to vent the cleaning air to the outside without permitting passage of dirty particles with the vented air.

While a preferred embodiment of the present invention has been herein shown and described, Applicant claims the benefit of a full range of equivalents within the scope of the appended claims.

I claim:

1. Industrial dust filter apparatus comprising:

a housing defining an upper clean air chamber and a lower dirty air chamber separated by a wall having at least a pair of openings therethrough, spaced from each other longitudinally of said chambers;

an elongated vertically positioned venturi in said dirty air chamber in fluid communication with said openings and extending downwardly therefrom;

at least two annular pleated cartridge type filters supported within the upper part of said venturi by said wall and each being aligned with one of said openings respectively, said filters extending downwardly to a point adjacent the upper end of the decreasing cross section of said venturi and being closed at their lower ends to expose the outer surface of said filters to the dirty air chamber;

means for positively venting clean air from said clean air chamber;

means for admitting dirty air to be filtered into said dirty air chamber so as to pass upwardly through said venturi, radially inwardly of said filters and axially out of said filters to said clean air chamber;

means defining a plurality of downwardly directed jet nozzles in said venturi and above the throat thereof;

means for supplying said nozzles with pressurized blasts of air to induce a reverse flow through said filters; and means for removing particulate matter cleaned from said filters from the lower portion of said dirty air chamber.

2. Apparatus as defined by claim 1 including:

a further chamber communicating with the lower end of said venturi;

a normally closed check valve between said further chamber and said venturi arranged to open during a cleaning cycle;

filtered vent means from said chamber to ambient; and particulate collection means communicating with said further chamber.

3. Apparatus as defined by claim 1 or 2 including at least two pairs of openings through said wall and at least four filters, one surrounding each opening respectively, and at least a pair of venturis, one surrounding each pair of filters respectively.

* * * * *